(12) United States Patent
Nathan

(10) Patent No.: US 9,959,304 B2
(45) Date of Patent: May 1, 2018

(54) AUTOMATIC NER DICTIONARY GENERATION FROM STRUCTURED BUSINESS DATA

(71) Applicant: Eyal Nathan, Reut (IL)

(72) Inventor: Eyal Nathan, Reut (IL)

(73) Assignee: SAP Portals Israel Ltd, Ra'anana (IL)

( * ) Notice: Subject to any disclaimer, the term of this patent is extended or adjusted under 35 U.S.C. 154(b) by 426 days.

(21) Appl. No.: 14/697,855

(22) Filed: Apr. 28, 2015

(65) Prior Publication Data

US 2016/0267116 A1   Sep. 15, 2016

Related U.S. Application Data

(60) Provisional application No. 62/131,651, filed on Mar. 11, 2015.

(51) Int. Cl.
*G06F 17/30* (2006.01)

(52) U.S. Cl.
CPC .. *G06F 17/30321* (2013.01); *G06F 17/30286* (2013.01); *G06F 17/30684* (2013.01); *G06F 17/30766* (2013.01); *G06F 2221/2113* (2013.01)

(58) Field of Classification Search
CPC ......... G06F 17/30321; G06F 17/30684; G06F 17/30766; G06F 17/30286; G06F 2221/2113
USPC ........................................................ 707/741
See application file for complete search history.

(56) References Cited

U.S. PATENT DOCUMENTS

| 5,832,480 A | * | 11/1998 | Byrd, Jr. ........... G06F 17/30985 707/723 |
| 8,489,561 B1 | * | 7/2013 | Nathan ............. G06F 17/30557 707/691 |
| 2004/0181512 A1 | * | 9/2004 | Burdick ............ G06F 17/30371 707/769 |
| 2013/0086483 A1 | | 4/2013 | Vainer et al. |
| 2013/0086495 A1 | | 4/2013 | Guzansky et al. |
| 2013/0091132 A1 | | 4/2013 | Khalatov et al. |
| 2013/0091456 A1 | | 4/2013 | Sherman et al. |
| 2013/0159926 A1 | | 6/2013 | Vainer et al. |

(Continued)

OTHER PUBLICATIONS

U.S. Appl. No. 13/732,792, filed Jan. 2, 2013, Lehmann et al.

(Continued)

*Primary Examiner* — Shahid Alam
(74) *Attorney, Agent, or Firm* — Fish & Richardson P.C.

(57) ABSTRACT

The present disclosure involves systems, software, and computer implemented methods for generating NER dictionaries from structured business data. In one example, a method may include identifying a set of structured data for use in generating a NER dictionary, identifying a particular collection within the identified structured data to use in the dictionary generation, the particular identified collection including a plurality of values, identifying at least one variant of the value for each value in the particular identified collection, each of the at least one variants of the value including at least a portion of the underlying value, determining a set of unique variants from the identified at least one variants across each of the values in the particular identified subset, adding the determined set of unique variants to the generated dictionary, each unique variant added to the generated dictionary being associated with the value from which the unique variant was derived.

17 Claims, 5 Drawing Sheets

(56) References Cited

U.S. PATENT DOCUMENTS

| | | |
|---|---|---|
| 2013/0166678 A1 | 6/2013 | Barak et al. |
| 2013/0283146 A1 | 10/2013 | Barak et al. |
| 2014/0046910 A1 | 2/2014 | Nathan et al. |
| 2014/0059144 A1 | 2/2014 | Lehmann et al. |
| 2014/0068545 A1 | 3/2014 | Lehmann et al. |

OTHER PUBLICATIONS

U.S. Appl. No. 13/740,858, filed Jan. 14, 2013, Nathan et al.
U.S. Appl. No. 13/904,544, filed May 29, 2013, Lehmann et al.
U.S. Appl. No. 13/916,857, filed Jun. 13, 2013, Lehmann et al.
U.S. Appl. No. 13/943,581, filed Jul. 16, 2013, Lehmann et al.
U.S. Appl. No. 13/970,977, filed Aug. 20, 2013, Nathan et al.
U.S. Appl. No. 14/035,038, filed Sep. 24, 2013, Sherman et al.
U.S. Appl. No. 14/040,932, filed Sep. 30, 2013, Shoshin et al.
U.S. Appl. No. 14/044,555, filed Oct. 2, 2013, Ebner et al.

\* cited by examiner

```xml
<?xml version="1.0" encoding="UTF-8"?>
<dictionary xmlns="http://www.xyz.com/ta/4.0">
  <entity_category name="CRM_CUSTOMER">
    <entity_name standard_form="100032210874">
      <variant name="FMC Corporation (UK) Limited" />
      <variant name="FMC Corporation (UK)" />
      <variant name="FMC Corporation" />
      <variant name="FMC" />
      <variant name="@fmc.com" />
      <variant name="@fks.fmcti.com" />
      <variant name="@sks.fmcti.com" />
    </entity_name>
    <entity_name standard_form="100032211477">
      <variant name="Shaftesbury Housing Association" />
      <variant name="Shaftesbury Housing" />
      <variant name="SHA" />
    </entity_name>
    <entity_name standard_form="100032226331">
      <variant name="Aerocan UK Ltd" />
      <variant name="Aerocan UK" />
      <variant name="Aerocan" />
      <variant name="@aerocan.eu" />
    </entity_name>
    <entity_name standard_form="100032217488">
      <variant name="ISG Novasoft (Europe)" />
      <variant name="ISG Novasoft" />
      <variant name="ISG" />
    </entity_name>
    <entity_name standard_form="10003221616">
      <variant name="CH2M Hill UK" />
      <variant name="CH2M Hill" />
      <variant name="CH2M" />
      <variant name="@uk.ch2m.com" />
    </entity_name>
      <entity_name standard_form="10003213748">
      <variant name="Sanderson Bramall Motor Group Plc" />
      <variant name="Sanderson Bramall Motor Group" />
      <variant name="Sanderson Bramall Motor" />
      <variant name="Sanderson Bramall" />
      <variant name="SBMG" />
      <variant name="SBM" />
    </entity_name>
  </entity_category>
</dictionary>
```

FIG. 5

AUTOMATIC NER DICTIONARY GENERATION FROM STRUCTURED BUSINESS DATA

CLAIM OF PRIORITY

This application claims priority under 35 USC § 119(e) to U.S. Provisional Patent Application Ser. No. 62/131,651, filed on Mar. 11, 2015, the entire contents of which are hereby incorporated by

BACKGROUND

The present disclosure relates to computer systems and computer-implemented methods for generating a Named Entity Recognition (NER) dictionary used in a NER process.

NER (also referred to as Named Entity Extraction) is a subtask of information extraction that seeks to locate and classify elements in text into pre-defined categories, such as the names of persons, organizations, locations, expressions of times, quantities, monetary values, percentages, etc. In many cases, implementations of the NER system are structured as taking an unannotated block of text and producing an annotated block of text that highlights the names of entities.

SUMMARY

The present disclosure involves systems, software, and computer-implemented methods for generating NER dictionaries. One computer-implemented method includes: identifying a set of structured data for use in generating a NER dictionary, identifying a particular collection within the identified structured data to use in the dictionary generation, the particular identified collection including a plurality of values, identifying at least one variant of the value for each value in the particular identified collection, each of the at least one variants of the value including at least a portion of the underlying value, determining a set of unique variants from the identified at least one variants across each of the values in the particular identified subset, adding the determined set of unique variants to the generated dictionary, each unique variant added to the generated dictionary being associated with the value from which the unique variant was derived.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 is an example screenshot of a sample NER dictionary.

DETAILED DESCRIPTION

The present disclosure describes systems and tools for creating a more precise NER process by automatically generating a business-optimized dictionary on which to base the NER process. This disclosure describes the process to generate dictionaries used for extracting references to business entities (e.g., company names, product names, order numbers, etc.) from unstructured texts as of part of a NER process.

There are several approaches to a NER process, including statistical models, machine learning, and others. This disclosure is focused on dictionary-backed NER, meaning that the extraction process scans texts to find tokens that are part of a pre-defined dictionary. The present solution addresses the transformation of the data stored in business systems (e.g., ERP, CRM, etc.) into a format that can be used as a dictionary in the execution of such NER algorithms in a way that provides the highest precision for the extraction process. Any suitable NER algorithm based on pre-defined dictionaries will benefit from the solution.

In unstructured data, textual references to business entities are consistently incomplete. For example, the company "Acme Shipping Ltd." might be referred to as "Acme" or "Acme Shipping," and "contract number 10000123456" might be referred to as simply "contract 123456" within various documents, emails, messages, purchase orders, sales receipts, and other unstructured data. The tools described herein are used to maximize the precision of the NER process, even if, in some cases, the tools cause a negative effect on the recall percentage. Restated, the value of ensuring correctness in the identified matches of the NER analysis (i.e., the precision of the process) is maximized even where the likelihood of finding particular business-relevant information in the analyzed documents (i.e., the recall of the process) is reduced. By doing so, confidence in matches can be maximized.

Figure 1:
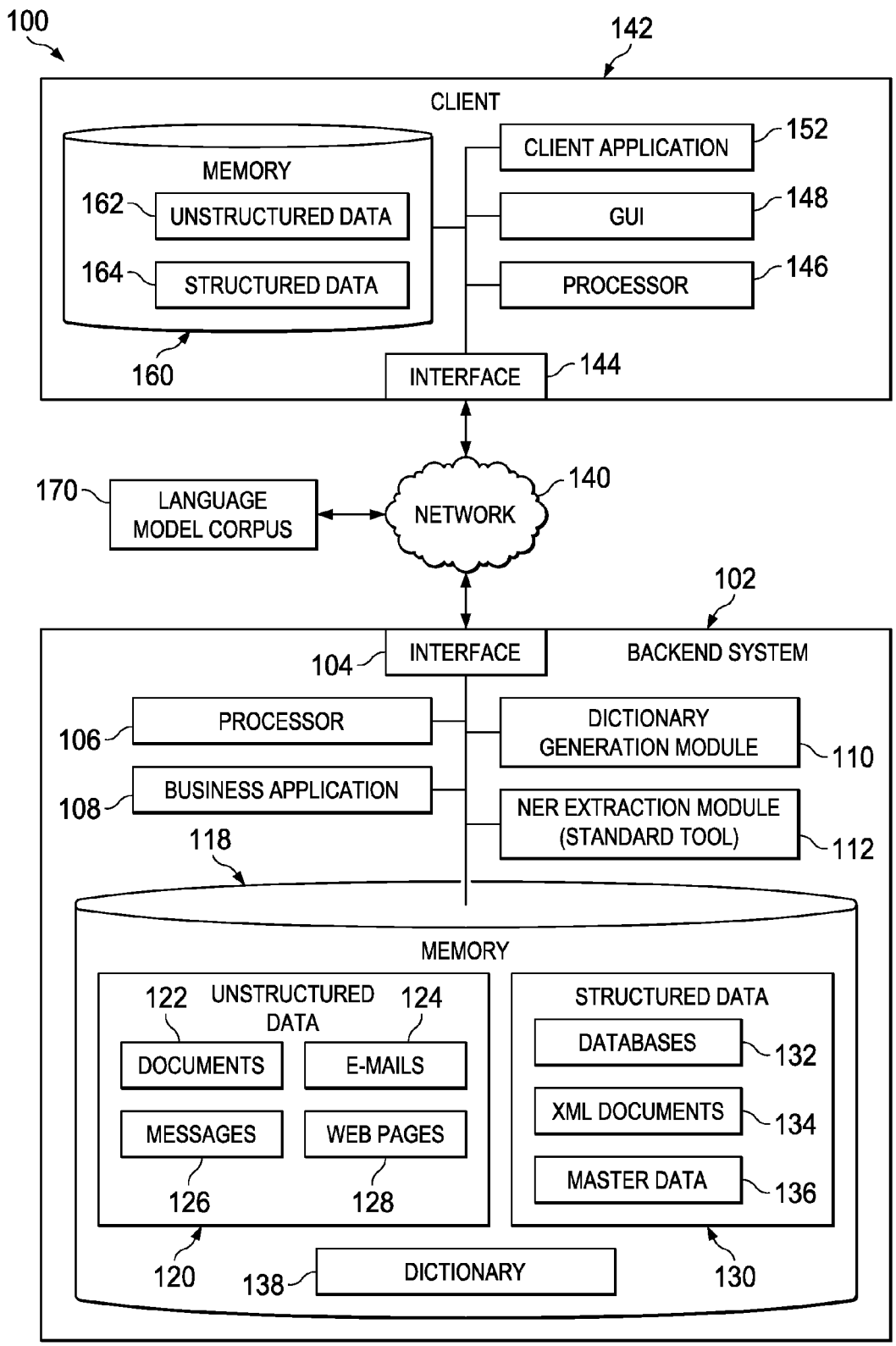
FIG. 1 is a block diagram illustrating an example system for generating NER dictionaries based on structured business data.

Turning to the illustrated embodiment, FIG. 1 is a block diagram illustrating an example system 100 for automatically generating NER dictionary from structured business data. As illustrated in FIG. 1, system 100 is a client-server system capable of automatically generating NER dictionaries that can be used for extracting references to business entities, such as, for example, company names, product names, business contacts, and/or order numbers, from unstructured data as part of a NER extraction process. In some instances, a client system alone may be sufficient to perform the operations of the system 100, such as when structured data stored locally on the client is associated with particular, underlying entities that are being searched, and where the client is capable to generate an appropriate NER dictionary. In other instances, a NER dictionary may be requested from a backend server (e.g., backend system 102), such that the server generates the NER dictionary based on structured data stored at the server. In other instances, unstructured data 162 may be sent to the backend server (e.g., backend system 102), such that the server scans the received unstructured data 162 to identify business entities that are part of a pre-defined NER dictionary. Specifically, system 100 as illustrated includes or is communicably coupled with a client 142, backend system 102, network 140, and a language model corpus 170. The language model corpus 170 may be used to compare against the generated NER dictionary to ensure any common words/phrases are removed before any NER extraction is performed. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, backend system 102 may be any computer or processing device such as, for example, a blade server, general-purpose personal computer (PC), Mac®, workstation, UNIX-based workstation, or any other suitable device. Moreover, although FIG. 1 illustrates backend system 102 as a single system, backend system 102 can be implemented using two or more systems, as well as computers other than servers, including a server pool. In other words, the present disclosure contemplates computers other than general-purpose computers, as well as computers without conventional operating systems. Further, illustrated backend system 102, client 142, and the language model corpus 170 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, backend system 102 may be any suitable backend computing server or system storing data (e.g., dictionary 138) for presentation to users in response to requests for the same. The backend system 102 is described herein in terms of responding to requests for generating NER dictionaries and performing one or more NER extractions from users at client 142 and other clients. However, the backend system 102 may, in some implementations, be a part of a larger system providing additional functionality. For example, backend system 102 may be part of an enterprise business application or application suite providing one or more of enterprise relationship management, data management systems, customer relationship management, and others.

The illustrated backend system 102 can store unstructured data 120, structured data 130, and, in response to requests from clients 142, generate the dictionary 138 via responsive communications. In some instances, the backend system 102 may store unstructured data 120 locally. The unstructured data 120 includes documents 122, e-mails 124, messages 126, and web pages 128, as well as other suitable unstructured data. In some instances, the backend system 102 can receive unstructured data 120 from any suitable location, including the client 142 and other external sources. The structured data 130 contains information used to generate the NER dictionary that is stored in dictionary 138. The structured data 130 includes databases 132, XML documents 134, and master data 136 with links to the particular underlying entities that are being searched. In general, structured data may include data that resides in a fixed field within a record or file, including data contained in relational databases and spreadsheets. Structured data may depend on an existing data model which describes or manages the types of business data that will be recorded and how they will be stored, processed, and accessed. The data model can include definitions of what fields of data will be stored and how that data will be stored: data type (e.g., numeric, currency, alphabetic, name, date, address), and any restrictions on the data input (number of characters; restricted to certain terms; etc.). Structured data has the advantage over unstructured data of being easily entered, stored, queried, and analyzed. Further, the relationships and design of the structured data allows the data to be analyzed, understood, and used to determine the contents or relationships to information stored in unstructured data.

As illustrated, backend system 102 includes an interface 104, a processor 106, a business application 108, a dictionary generation module 110, a NER extraction module 112, and memory 118. In general, the backend system 102 is a simplified representation of one or more systems and/or servers that provide the described functionality, and is not meant to be limiting, but rather an example of the systems possible.

The interface 104 is used by the backend system 102 for communicating with other systems in a distributed environment—including within the environment 100—connected to the network 140, e.g., client(s) 142 and other systems communicably coupled to the network 140. Generally, the interface 104 comprises logic encoded in software and/or hardware in a suitable combination and operable to communicate with the network 140. More specifically, the interface 104 may comprise software supporting one or more communication protocols associated with communications such that the network 140 or interface's hardware is operable to communicate physical signals within and outside of the illustrated environment 100.

Network 140 facilitates wireless or wireline communications between the components of the environment 100 (i.e., between the backend system 102 and client(s) 142, between clients 142, and among others), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components may be included within network 140 as one or more cloud-based services or operations. For example, the language model corpus 170 storing common words/phrases may be cloud-based services. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11ac/ad,/af/a/b/g/n, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the backend system 102 includes a processor 106. Although illustrated as a single processor 106 in FIG. 1, two or more processors may be used according to particular needs, desires, or particular implementations of the environment 100. Each processor 106 may be a central processing unit (CPU), an application-specific integrated circuit (ASIC), a field-programmable gate array (FPGA), or another suitable component. Generally, the processor 106 executes instructions and manipulates data to perform the operations of the backend system 102. Specifically, the processor 106 executes the algorithms and operations described in the illustrated figures, including the operations performing the functionality associated with the backend system 102 generally, as well as the various software modules (e.g., the business application 108), including the functionality for sending communications to and receiving transmissions from client(s) 142.

The business application 108 represents an application, set of applications, software, software modules, or combination of software and hardware used to perform operations related to presenting and executing operations using the unstructured data 120, structured data 130, and/or dictionary 138. In the present solution, the business application 108 can perform operations including initiating generation of a NER dictionary based on structured data 130, receiving requests for identifying business entities from particular unstructured data 120, evaluating the request and user specified unstructured data associated with the request, identifying business entities that are part of the NER dictionary, and providing the requested business entities based on the evaluation. The business application 108 can include and provide various functionality to assist in the management and execution of providing the requested business entities.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The dictionary generation module 110 can provide functionality associated with generating a NER dictionary 138. The dictionary generation module 110 transforms the structured data 130 stored in the backend system 102 into a format that can be used as a dictionary for the NER extraction module 112. Example operations of the dictionary generation module 110 are explained in later figures. Generally, however, the dictionary generation module 110 receives an identification of a set of structured data to use as the basis of the dictionary generation. From there, variant values of a particular collection, column, or related set of data are generated and associated with a unique identifier. These values, along with variant values of related entries in the structured data, are added to the dictionary.

The NER extraction module 112 performs operations associated with extracting business entities from unstructured text based on the generated NER dictionary 138. In some instances, the unstructured text may be included in a request for identifying business entities. In some instances, the unstructured text may be retrieved from the unstructured data 120 according to instructions included in the request.

As illustrated, backend system 102 includes memory 118, or multiple memories 118. The memory 118 may include any memory or database module and may take the form of volatile or non-volatile memory including, without limitation, magnetic media, optical media, random access memory (RAM), read-only memory (ROM), removable media, or any other suitable local or remote memory component. The memory 118 may store various objects or data, including financial and/or business data, user information, behavior and access rules, administrative settings, password information, caches, applications, backup data, repositories storing business and/or dynamic information, and any other appropriate information including any parameters, variables, algorithms, instructions, rules, constraints, or references thereto associated with the purposes of the business application 108 and/or backend system 102. Additionally, the memory 118 may store any other appropriate data, such as VPN applications, firmware logs and policies, firewall policies, a security or access log, print or other reporting files, as well as others. For example, illustrated memory 118 includes unstructured data 120, structured data 130, and dictionary 138.

As illustrated, unstructured data 120 includes documents 122, e-mails 124, messages 126, and web pages 128. Additionally, unstructured data 120 may be data or programming code associated with a particular application (e.g., business application 108 or client application 152). Documents 122 may be a particular file type, such as a PDF, a Word document, a PowerPoint document, or any other suitable file or file type. Web pages 128 may be a particular web page, web-based application, or other web- or internet-based content.

The structured data 130 in memory 118 provides a basis for generating the NER dictionary 138. A user can define particular columns or collections in the structured data 130. The structured data 130 includes databases 132, XML documents 134, and master data 136 with links to the particular underlying entities that are being searched. Alternative and additional suitable types of structured data 130 may be available upon which a dictionary can be generated.

Client 142 may be any computing device operable to connect to or communicate with backend system 102, other clients (not illustrated), or other components via network 140, as well as with the network 140 itself, using a wireline or wireless connection, and can include a desktop computer, a mobile device, a tablet, a server, or any other suitable computer device. In general, client 142 comprises an electronic computer device operable to receive, transmit, process, and store any appropriate data associated with the environment 100 of FIG. 1. In some instances, client 142 can be a particular thing within a group of the internet of things, such as a connected appliance or tool.

As illustrated, client 142 includes an interface 144, a processor 146, a graphical user interface (GUI) 148, a client application 152, and memory 160. Interface 144 and processor 146 may be similar to or different than the interface 104 and processor 106 described with regard to backend system 102. In general, processor 146 executes instructions and manipulates data to perform the operations of the client 142. Specifically, the processor 146 can execute some or all of the algorithms and operations described in the illustrated figures, including the operations performing the functionality associated with the client application 152 and the other components of client 142. Similarly, interface 144 provides the client 142 with the ability to communicate with other systems in a distributed environment—including within the environment 100—connected to the network 140.

Client 142 executes a client application 152. The client application 152 may operate with or without requests to the backend system 102—in other words, the client application 152 may execute its functionality without requiring the backend system 102 in some instances, such as by accessing structured data 164 stored locally on the client 142. In others, the client application 152 may be operable to interact with the backend system 102 by sending requests via network 140 to the backend system 102 for identifying business entities. In some implementations, the client application 152 may be a standalone web browser, while in others, the client application 152 may be an application with a built-in browser. The client application 152 can be a web-based application or a standalone application developed for the particular client 142. For example, the client application 152 can be a native iOS application for iPad, a desktop application for laptops, as well as others. In another example, the client application 152, where the client 142 is a particular thing (e.g., device) within a group of the internet of things, may be software associated with the functionality of the thing or device. In some instances, the client application 152 may be an application that requests for identifying business entities from the backend system 102 for presentation and/or execution on client 142. In some instances, client application 152 may be an agent or client-side version of the business application 108.

In instances where the client application 152 requests for identifying business entities from the backend system 102, the requests may identify unstructured text associated with the client 142 at the time of the request. In particular, the client application 152 may send unstructured text associated with the client 142 along with the request. The client application 152 can pull or retrieve information from one or more components, modules, applications, hardware, and/or other programs executing at the client 142 to determine the unstructured text. Those may include unstructured data 162. Other suitable components, whether hardware, software, or both, may be included in the client 142 to assist in determining the unstructured text.

The client application 152 can access some or all of the information generated by these components and use the information to request unstructured text. If the unstructured text requested is unstructured data 120 at backend system 102, the information may be included in the request for the unstructured data 120. If, however, the unstructured text requested is unstructured data 162 stored locally at client 142 in memory 160, then the client application 152 may perform at least some of the calculations related to how the unstructured data 162 is to be presented or executed described previously as being performed at the backend system 102.

Memory 160 may be similar to or different from memory 118 of the backend system 102. In general, memory 160 can store unstructured data 162 and structured data 164. The unstructured data 162 can be provided to the backend system 102 to extract references to business entities when sending requests to the backend system 102. The structured data 164 can be used locally to extract references to business entities that are being searched.

The illustrated client 142 is intended to encompass any computing device such as a desktop computer, laptop/notebook computer, mobile device, smartphone, personal data assistant (PDA), tablet computing device, one or more processors within these devices, or any other suitable processing device. For example, the client 142 may comprise a computer that includes an input device, such as a keypad, touch screen, or other device that can accept user information, and an output device that conveys information associated with the operation of the client application 152 or the client 142 itself, including digital data, visual information, or a GUI 148, as shown with respect to the client 142.

The illustrated language model corpus 170 is used to compare against the generated NER dictionary. Using the comparison to the language model corpus 170, any common words/phrases are removed before finalizing the dictionary and performing an NER extraction. In some implementations, the language model corpus 170 may be generated by scanning the content of English Wikipedia to produce a language model of word sequences. In some other implementations, Wikipedia in a language other than English may be used to generate the language model corpus 170. In general, the language model corpus 170 may be any collection in the language of the structured data that provides a listing of common words or phrases. The corpus 170 may be generated by the user associated with the dictionary generation, or the corpus 170 may be identified from a retrievable location or source, such as a predefined list of common phrases in a language.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
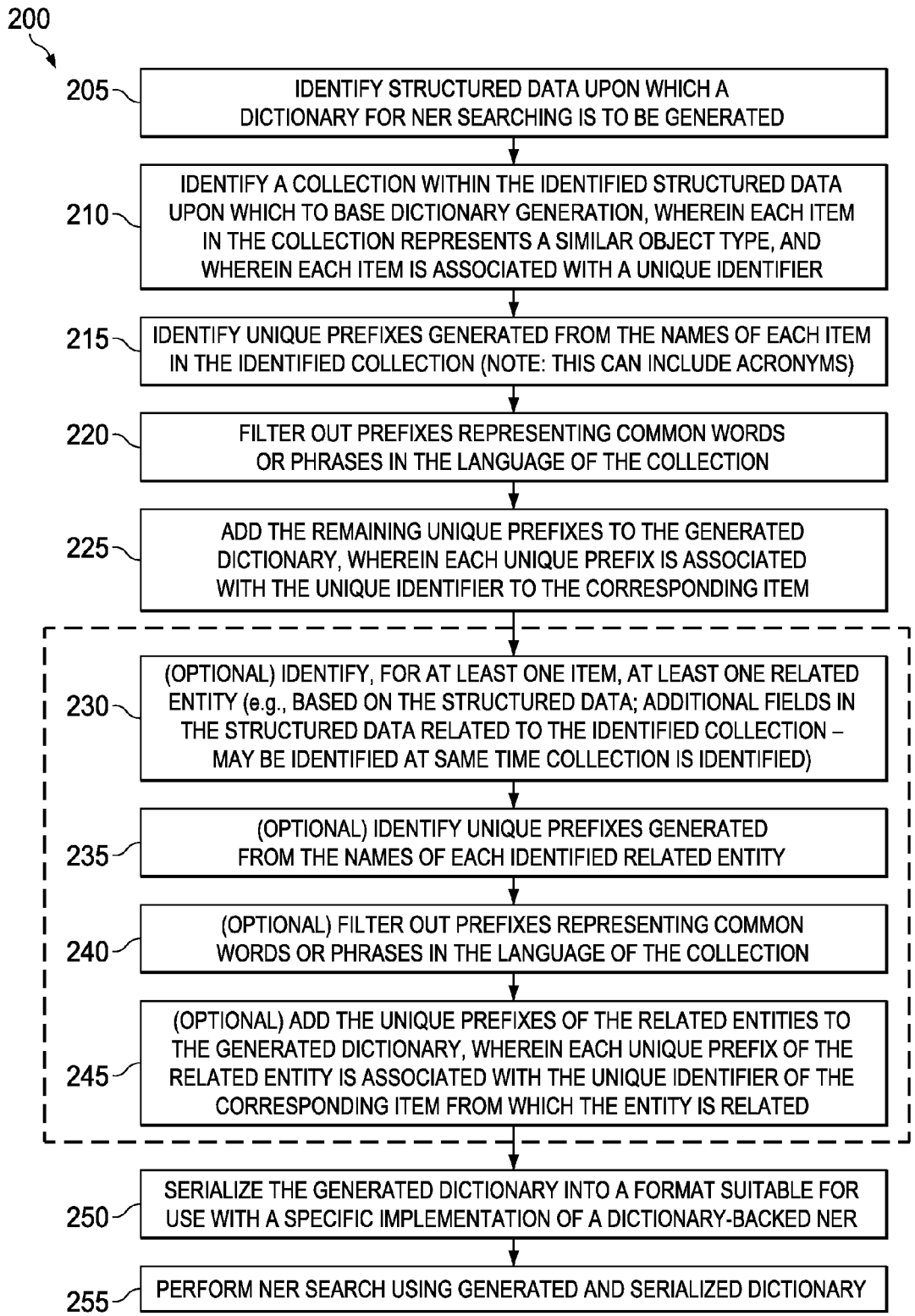
FIG. 2 is a flowchart of an example operation performed to generate a dictionary used for a NER process.

FIG. 2 is an illustration of example operations 200 performed to generate a NER dictionary from structured business data. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate. In the described method 200, the operations may be performed locally at a client when structured data is local to the client or, alternatively, at a remote content server receiving a request from the client.

At 205, structured data for use in generating a dictionary for NER searching is identified. As described above, the structured data may be local to the client or may be stored at a remote device or system.

At 210, a particular collection within the identified structured data to use in the dictionary generation is identified. The particular collection includes a plurality of items. Each item in the collection represents a similar object type. Each item is associated with a unique identifier. The identifier can have two types that allow the extraction of business entities from text, with different solutions possible in both situations. Additionally, similar solutions can be implemented in similar situations based on an analysis and understanding of the underlying data being considered. In a first example solution explained in FIG. 3, the business data being added to the dictionary may be based on structured business data relating to the names of or associated with business entities, including product names, company names, and customer names, among other types of data. In a second example solution explained in FIG. 4, the business data being added to the dictionary may be based on structured business data relating to the numbers of business entities, including order number and contract number, among other types of data. In some instances, the particular collection may represent a primary key or set of values where each entry is unique.

At 215, unique prefixes (or suffixes, where appropriate) generated from names of each item in the identified collection are identified. For each item, at least one variant of the name of the item is identified. The at least one variant of the name can include at least a portion of the name. A set of unique variants from the identified at least one variants across each item in the particular identified subset is determined. Each unique variant is associated with the object type of the particular collection. Each unique variant is associated with the unique identifier of the item from which the unique identifier was derived. In some cases, the set of unique variants includes an acronym of the determined unique variants. The unique variants may be created by removing a portion of the item name, such as by removing according to delimiters in the value (e.g., by spaces within the name, or by leading values such as a known set of leading numbers). For example, if the full name of a particular entry is "Acme Shipping UK Limited," multiple variants can be generated. In one instance, those variants can include:

1) "Acme Shipping UK Limited"—the full name as entered in the structured data;
2) "Acme Shipping UK"—the full name with the final word removed;
3) "Acme Shipping"—the name with another word removed; and
4) "Acme"—only the first word of the phrase.

At 220, prefixes representing common words or phrases in the language of the collection are removed from the determined set of unique variants. In some implementations, the prefixes, variants, and/or acronyms that remain after the uniqueness check can be compared to a set of common words in the language of the unstructured data to be analyzed. For example, consider the company "Tomorrow Technologies Inc." If the phrase "Tomorrow" is identified as a unique prefix, the analysis on the unstructured data is likely to identify this company whenever the word "tomorrow" appears in a text, leading to a low precision. To avoid this issue, a language model can be identified, maintained, or generated, where the language model provides a set of common words or phrases within a particular language. The language model can, in general, identify a plurality of relatively common terms within the particular language that are likely to appear in any document or unstructured data. In some instances, the language model can be provided by a third party, derived based on an analysis of a statistically significant corpus of documents, or created based on known common terms. If a unique variant matches one of the entries in the language model, then the variant may be discarded prior to populating the dictionary to avoid an imprecise NER analysis.

Any suitable method of generating or obtaining the language model may be used. In one example, a TF-IDF methodology may be used to determine a frequency of particular terms and/or phrases in the particular language, such as by analysis of a corpus of documents. In some instances, the language model may be a table generated from the analysis, where the table is generated by scanning a large corpus of documents in the particular language and counting the number of documents in which each word or word sequence appears. Words or phrases present in the corpus above a threshold percentage of appearance may be determined as words or phrases of such commonality of occurrence that they should be removed from any dictionaries being generated by the process. Filtering of the prefixes (or suffixes) is performed by checking each variant against this language model and removing any variant that occurs in more than the pre-defined threshold. This threshold may vary according to the required level of precision—for example, the threshold percentage may be 0.1% of the corpus scanned.

At 225, the remaining unique prefixes are added to the generated dictionary. Each unique prefix added to the generated dictionary is associated with the unique identifier of the item from which the unique prefix was derived.

In some implementations, a similar process for related business entities can be optionally performed. At 230, for at least one item, at least one related entity is identified (e.g., based on the structured data—that is, additional fields in the structured data related to the identified collection may be identified at same time collection is identified). At 235, unique prefixes generated from the names of each identified related entity are identified. At 240, prefixes representing common words or phrases in the language of the collection are filtered out. At 245, the unique prefixes of the related entities are added to the generated dictionary. In doing so, related entries to the particular collection (e.g., column) in the structured data for which the primary analysis is performed can be added to the dictionary and subsequently associated with the primary field, entry, or underlying business object. In one example, where the dictionary is being created to extract company names, the names and email addresses of company contacts may be added to the dictionary via their relationship within the structured data. If Joe Smith works for Acme Shipping UK Limited, then the terms "Joe Smith" and "joe.smith@acmeshipping" (and their respective variants) may be added to the dictionary should those phrases not be removed during the filtering operations comparing the phrases to other variants and to the language model. Those unique variants associated with the related entity can be associated with the unique identifier of the underlying item from the collection upon which the process is being performed.

All unique variants (i.e., prefixes, suffixes, and acronyms) of both the target entities (and their related entities, where used) remaining after the filtering process can then be added to the dictionary as an entry with the given object type of the initially identified collection, column, or structured data type (e.g. customer), along with a reference to the original business object or collection entity from which they were derived. In one example, this reference can be a unique identifier of the original business object within the business system, such as a customer number. In one example, the dictionary may be XML based, although any suitable format may be used.

At 250, the resultant dictionary can then be serialized into a format suitable for use with a specific implementation of dictionary-backed NER system. At 255, a NER search using generated and serialized dictionary is performed. In response to particular matches being made during the NER analysis, the link to particular business objects within the dictionary allow connections to be made with the identified search results, such that the analysis provides significant insight to the analysis documents. The results of the NER analysis can identify dictionary entries within the searched documents, where the identified dictionary entries are linked to or associated with the underlying original business object or entity.

Figure 3:
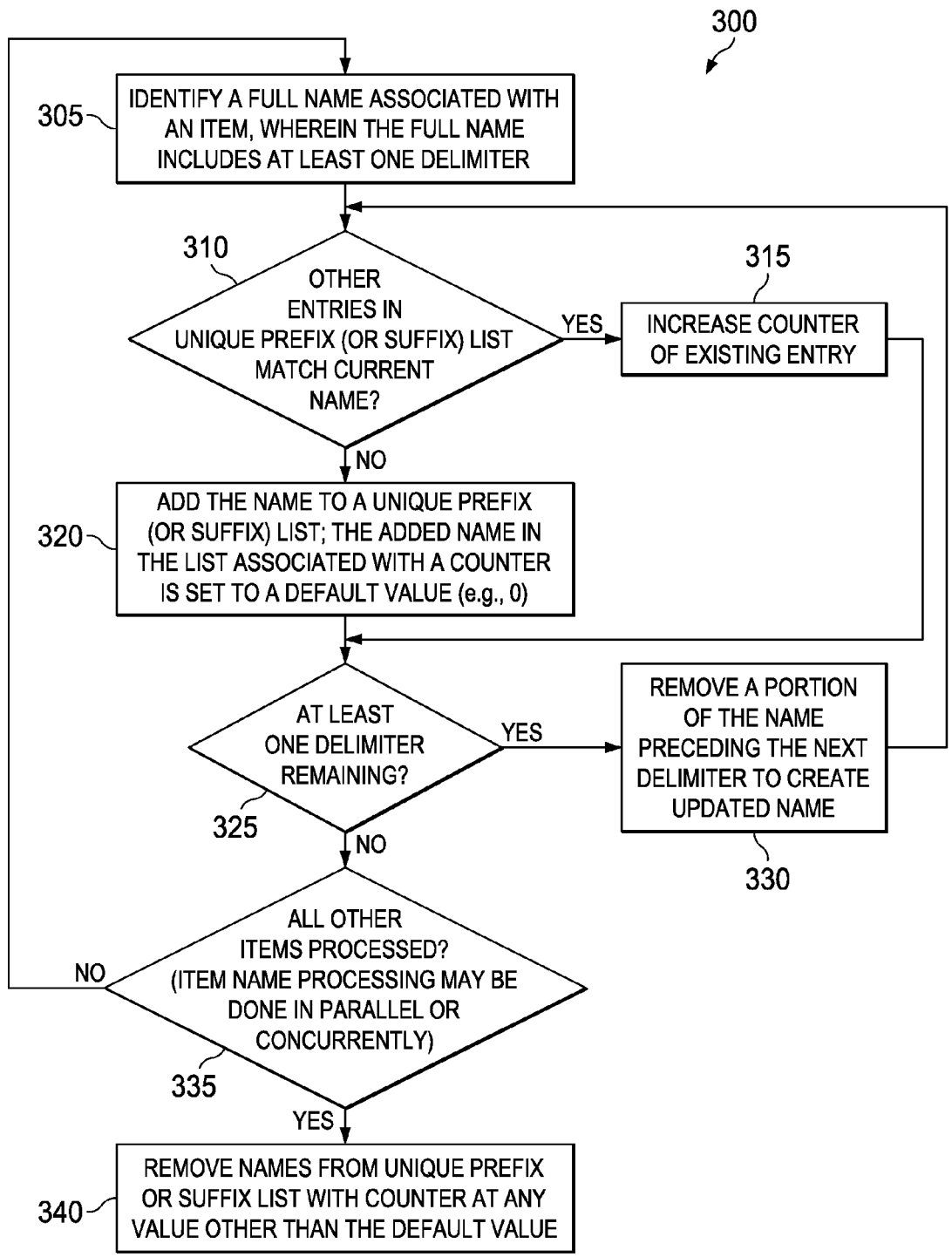
FIG. 3 is a flowchart of an example operation performed to identify unique prefixes for a particular item.

FIG. 3 is a flowchart of an example operation 300 performed to identify unique prefixes for a particular item. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a full name associated with an item is identified. The full name includes at least one delimiter. As an example, the identified full name of a particular entry in the collection is "Acme Finance GmbH."

At 310, a determination is made as to whether other entries in unique prefix (or suffix) list match current name. For purposes of the current description in FIG. 3, variants for "Acme Shipping UK Limited" as described in FIG. 2 are identified and added to a unique prefix (or suffix) list. If a match is found, method 300 continues to 315. If, however, a match is not found, method 300 continues to 320.

In some instances, a table is generated with an entry for each potential variant, where each variant entry is associated with a counter. For each entry, the counter is set to a default value, such as "0." The process generates similar variant lists for each entry. If any of the variants for the other entries matches a variant from a previously processed entry, then the count on that variant entry is increased, such as to "1."

As "Acme Finance GmbH" is unique and does not match any entries in the unique prefix (or suffix) list, method 300 continues to 320. At 320, the name "Acme Finance GmbH" is added to the unique prefix (or suffix) list. The added name in the list associated with a counter is set to a default value (e.g., 0). From 320, method 300 proceeds to 325.

At 325, a determination is made as to whether at least one delimiter remains in the name. If at least one delimiter remains, method 300 continues to 330. If, however, no delimiter remains, method 300 continues to 335. As "Acme Finance GmbH" includes two delimiters, method 300 continues to 330. At 330, a portion of the name preceding the next delimiter is removed to create an updated name. "GmbH" is removed from "Acme Finance GmbH," and "Acme Finance" is the updated name. From 330, method 300 proceeds to 310. Similar to operations discussed above, "Acme Finance" is added to the unique prefix (or suffix) list, and "Finance" is removed. "Acme" is now the updated name at 310.

While "Acme Finance GmbH" and "Acme Finance" are unique, the last variant of "Acme" is identical to a prior entry "Acme" of "Acme Shipping UK Limited." From 310, method 300 proceeds to 315. At 315, the counter associated with the existing entry, "Acme" in this example, can be incremented to identify the multiple versions. In some instances, the counter is set to "1" upon the second instance of "Acme."

As "Acme" includes no further delimiters, method 300 continues to 335. At 335, a determination is made as to whether all other items in the collection are processed. The item name processing may be done in parallel or concurrently. If not all items are processed, method 300 moves to next value in the collection and continues to 305. If, however, all items are processed, method 300 continues to 340.

At 340, names from the unique prefix or suffix list with counter at any value other than the default value are removed. In some instances, upon completion of the variant generation for each of the entries, any strings or prefixes that have a count greater than 0, which indicates that the variant is not unique and/or is ambiguous, are discarded from the potential dictionary. It is noted that while the example uses entire words within the entry to draw the distinction between variants, in some instances portions of the terms may be used, instead. For example, if two entries in the collection were "Shipment" and "Shipper," the variants of "Shipm" and "Shipp" could be used to distinguish between the two entries, if so desired.

In some instances, unique acronyms associated with the remaining prefixes may be generated. The unique acronyms can then be analyzed to verify the acronyms' uniqueness. If the acronym is unique, the acronym may be useful in being added to the dictionary.

Figure 4:
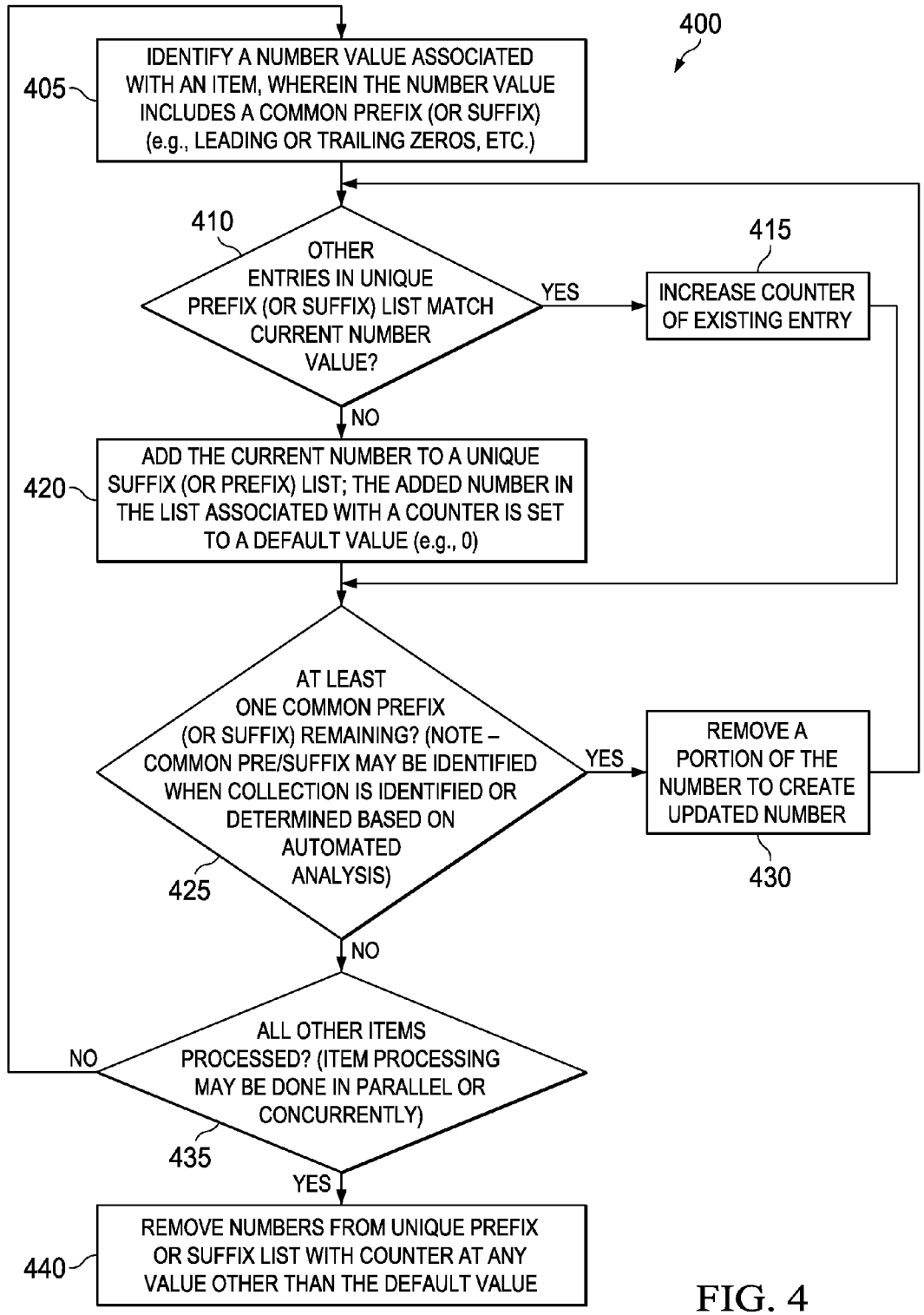
FIG. 4 is a flowchart of an example operation for identify unique prefixes for a particular numerical item name.

FIG. 4 is a flowchart of an example operation 400 for identifying unique prefixes for a particular numerical item name. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a numerical name associated with an item is identified. The numerical name includes a common prefix (or suffix) (e.g., leading or trailing zeros, etc.).

At 410, a determination is made as to whether other entries in unique prefix (or suffix) list match current numerical name. If a match is found, method 300 continues to 415. If, however, a match is not found, method 300 continues to 420.

In some instances, a table is generated with an entry for each potential variant, where each variant entry is associated with a counter. For each entry, the counter is set to a default value, such as "0." The process generates similar variant lists for each entry. If any of the variants for the other entries matches a variant from a previously processed entry, then the count on that variant entry is increased, such as to "1."

At 415, the counter associated with the existing entry can be incremented to identify the multiple versions. From 415, method 400 proceeds to 425.

At 420, the current numerical name is added to the unique prefix (or suffix) list. The added numerical name in the list associated with a counter is set to a default value (e.g., 0). From 420, method 400 proceeds to 425.

At 425, a determination is made as to whether at least one common prefix (or suffix) remains in the numerical name. If at least one common prefix (or suffix) remains, method 400 continues to 430. If, however, no common prefix (or suffix) remains, method 400 continues to 435.

At 430, a portion of the numerical name (e.g., the common prefix (or suffix)) is removed to create an updated numerical name. From 430, method 400 proceeds to 410.

At 435, a determination is made as to whether all other items in the collection are processed. The item processing may be done in parallel or concurrently. If not all items are processed, method 400 moves to next value in the collection and continues to 405. If, however, all items are processed, method 400 continues to 445.

At 445, numerical names from unique prefix or suffix list with counter at any value other than the default value are removed. In some instances, upon completion of the variant generation for each of the entries, any strings or prefixes that have a count greater than 0, which indicates that the variant is not unique and/or is ambiguous, are discarded from the potential dictionary.

FIG. 5 illustrates an example screenshot 500 of a sample NER dictionary. In this example, the NER dictionary is generated from XML documents (i.e., "http://www.sap.com/ta/4.0"). The business data being added to the dictionary is based on company names. The screenshot 500 includes six sets of unique variants for six companies. Each set of unique variants is associated with a unique identifier (i.e., customer number). As an example, a set of unique variants is listed in the sample NER dictionary for company "FMC Corporation (UK) Limited." Each unique variant of the company is associated with the unique customer number (i.e., 100032210874) of the company. Four unique variants are generated from the full name of the company: "FMC Corporation (UK) Limited," "FMC Corporation (UK)," "FMC Corporation," and "FMC." Three additional unique variants are generated from email addresses of the company's contact information: "@fmc.com," "@fks.fmcti.com," and "@sks.fmcti.com." Among the three additional unique variants, "@fks.fmcti.com" and "@sks.fmcti.com" are generated from related business entities to the company "FMC Corporation (UK) Limited."

Alternative methods of generating NER dictionaries from structured business data may be used in other implementations. Those described herein are examples and are not meant to be limiting.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A non-transitory computer storage medium encoded with a computer program, the program comprising instructions that when executed by one or more computers cause the one or more computers to perform operations comprising:
    identifying a set of structured data for use in generating a dictionary for a named entity extraction process;
    identifying a particular collection within the identified structured data to use in the dictionary generation, wherein the particular identified collection includes a plurality of values;
    for each value in the particular identified collection, identifying at least one variant of the value, wherein each of the at least one variant of the value includes at least a portion of the underlying value, wherein the value includes at least one delimiter, and wherein identifying the at least one variant of the value includes:
        identifying a first variant based on the full value;
        identifying a second variant by removing a first suffix from the full value to the first delimiter; and
        identifying additional variants by removing additional suffixes for each additional delimiter;
    determining a set of unique variants from the identified at least one variant across each of the values in the particular identified subset; and
    adding the determined set of unique variants to the generated dictionary, wherein each unique variant added to the generated dictionary is associated with the value from which the unique variant was derived.

2. The medium of claim 1, wherein the particular collection is associated with an object type, and wherein each unique variant added to the generated dictionary is associated with the object type of the particular collection.

3. The medium of claim 1, wherein each value within the collection is associated with a unique identifier, and wherein each unique variant added to the generated dictionary is associated with the unique identifier of the value from which the unique identifier was derived.

4. The medium of claim 1, wherein identifying at least one variant of the particular value includes identifying an acronym of the full value as a variant.

5. The medium of claim 1, wherein determining the set of unique variants from the identified at least one variant across each of the values in the particular identified subset includes:
    for each identified at least one variant:
        determining whether a prior entry in a list of identified at least one variant exists;
        in response to determining that a prior entry of the at least one variant does not exist, adding the at least one variant to the list of identified at least one variant, wherein the added at least one variant is associated with a counter set to a default value;
        in response to determining that a prior entry of the at least one variant exists, incrementing a counter associated with the prior entry; and
    removing any of the at least one variant from the list of identified at least one variant with an associated counter at any value other than the default value, wherein the list of identified at least one variant with associated counters at the default value represent the set of unique variants.

6. The medium of claim 1, the operations further comprising removing common words and phrases from the determined set of unique variants prior to adding the determined set of unique variants to the generated dictionary.

7. The medium of claim 1, wherein identifying the particular collection within the identified structured data to use in the dictionary generation includes identifying at least one additional collection within the structured data as a set of information related to the particular collection, the operations further comprising:
    for each value in the identified at least one collection:
        identifying at least one variant of the value, wherein each of the at least one variant of the value includes at least a portion of the underlying value; and
        identifying, for the value, an association to a particular value from the particular collection in which a relationship is defined within the structured data;
    determining at least one additional set of unique variants from the identified at least one variant across each of the values in the identified at least one additional collection;
    adding the determined at least one additional set of unique variants to the generated dictionary, wherein each unique variant added to the generated dictionary from the at least one additional set of unique variants is associated with the particular value from the particular collection in which the relationship is defined within the structured data.

8. A computerized method performed by one or more processors, the method comprising:
- identifying a set of structured data for use in generating a dictionary for a named entity extraction process;
- identifying a particular collection within the identified structured data to use in the dictionary generation, wherein the particular identified collection includes a plurality of values;
- for each value in the particular identified collection, identifying at least one variant of the value, wherein each of the at least one variant of the value includes at least a portion of the underlying value, wherein the value includes at least one delimiter, and wherein identifying the at least one variant of the value includes:
  - identifying a first variant based on the full value;
  - identifying a second variant by removing a first suffix from the full value to the first delimiter; and
  - identifying additional variants by removing additional suffixes for each additional delimiter;
- determining a set of unique variants from the identified at least one variant across each of the values in the particular identified subset; and
- adding the determined set of unique variants to the generated dictionary, wherein each unique variant added to the generated dictionary is associated with the value from which the unique variant was derived.

9. The method of claim 8, wherein the particular collection is associated with an object type, and wherein each unique variant added to the generated dictionary is associated with the object type of the particular collection.

10. The method of claim 8, wherein each value within the collection is associated with a unique identifier, and wherein each unique variant added to the generated dictionary is associated with the unique identifier of the value from which the unique identifier was derived.

11. The method of claim 8, wherein identifying at least one variant of the particular value includes identifying an acronym of the full value as a variant.

12. The method of claim 8, wherein determining the set of unique variants from the identified at least one variant across each of the values in the particular identified subset includes:
- for each identified at least one variant:
  - determining whether a prior entry in a list of identified at least one variant exists;
  - in response to determining that a prior entry of the at least one variant does not exist, adding the at least one variant to the list of identified at least one variant, wherein the added at least one variant is associated with a counter set to a default value;
  - in response to determining that a prior entry of the at least one variant exists, incrementing a counter associated with the prior entry; and
- removing any of the at least one variant from the list of identified at least one variant with an associated counter at any value other than the default value, wherein the list of identified at least one variant with associated counters at the default value represent the set of unique variants.

13. The method of claim 8, further comprising removing common words and phrases from the determined set of unique variants prior to adding the determined set of unique variants to the generated dictionary.

14. The method of claim 8, wherein identifying the particular collection within the identified structured data to use in the dictionary generation includes identifying at least one additional collection within the structured data as a set of information related to the particular collection, further comprising:
- for each value in the identified at least one collection:
  - identifying at least one variant of the value, wherein each of the at least one variant of the value includes at least a portion of the underlying value; and
  - identifying, for the value, an association to a particular value from the particular collection in which a relationship is defined within the structured data;
- determining at least one additional set of unique variants from the identified at least one variant across each of the values in the identified at least one additional collection;
- adding the determined at least one additional set of unique variants to the generated dictionary, wherein each unique variant added to the generated dictionary from the at least one additional set of unique variants is associated with the particular value from the particular collection in which the relationship is defined within the structured data.

15. A system comprising:
- one or more processors; and
- a computer-readable medium storing instructions executable by the one or more processors to perform operations comprising:
  - identifying a set of structured data for use in generating a dictionary for a named entity extraction process;
  - identifying a particular collection within the identified structured data to use in the dictionary generation, wherein the particular identified collection includes a plurality of values;
  - for each value in the particular identified collection, identifying at least one variant of the value, wherein each of the at least one variant of the value includes at least a portion of the underlying value, wherein the value includes at least one delimiter, and wherein identifying the at least one variant of the value includes:
    - identifying a first variant based on the full value;
    - identifying a second variant by removing a first suffix from the full value to the first delimiter; and
    - identifying additional variants by removing additional suffixes for each additional delimiter;
  - determining a set of unique variants from the identified at least one variant across each of the values in the particular identified subset; and
  - adding the determined set of unique variants to the generated dictionary, wherein each unique variant added to the generated dictionary is associated with the value from which the unique variant was derived.

16. The system of claim 15, wherein the particular collection is associated with an object type, and wherein each unique variant added to the generated dictionary is associated with the object type of the particular collection.

17. The system of claim 15, wherein each value within the collection is associated with a unique identifier, and wherein each unique variant added to the generated dictionary is associated with the unique identifier of the value from which the unique identifier was derived.

* * * * *